United States Patent
Park et al.

(10) Patent No.: US 9,041,929 B2
(45) Date of Patent: May 26, 2015

(54) METHOD FOR SECURING A DISPLAY DIAGNOSTIC DEVICE TO A DISPLAY

(75) Inventors: Taeyoung Park, Princeton, NJ (US); David Tobie, Mount Vernon, ME (US); Shawn Clark, Hamilton, NJ (US)

(73) Assignee: DATACOLOR HOLDING AG, Lucern (CH)

( * ) Notice: Subject to any disclaimer, the term of this patent is extended or adjusted under 35 U.S.C. 154(b) by 699 days.

(21) Appl. No.: 13/182,143

(22) Filed: Jul. 13, 2011

(65) Prior Publication Data

US 2013/0016350 A1     Jan. 17, 2013

(51) Int. Cl.
    *G01N 21/25*     (2006.01)
    *G01J 3/02*     (2006.01)

(52) U.S. Cl.
    CPC .......... *G01J 3/0202* (2013.01); *Y10T 29/49874* (2013.01)

(58) Field of Classification Search
    CPC ............... G01J 3/46; G01J 3/51; G01J 3/513; G01J 3/506
    USPC ........ 348/189; 356/402, 406, 407; 422/85, 86
    See application file for complete search history.

(56) References Cited

U.S. PATENT DOCUMENTS

| | | | |
|---|---|---|---|
| 6,067,166 A * | 5/2000 | Fox et al. | 356/402 |
| 6,784,995 B2 | 8/2004 | Merle et al. | |
| 7,027,140 B2 | 4/2006 | Slocum et al. | |
| 2008/0134794 A1 * | 6/2008 | Jonsson | 73/660 |

* cited by examiner

*Primary Examiner* — Jill Warden
*Assistant Examiner* — Dwayne K Handy
(74) *Attorney, Agent, or Firm* — Leason Ellis LLP.

(57) ABSTRACT

An apparatus for securing a diagnostic tool proximate to and in front of a display device between the corners thereof. A harness is adapted to releasably hold the diagnostic tool, a restraining bracket extends from the harness, and there is at least one elastic cord having a first end, an intermediate portion and a second end. The cord is threaded through the restraining bracket and is sized so as to impart elastic tension to the corners of the display device while concomitantly protecting the front surface from pressure due to the position of the harness and diagnostic tool.

18 Claims, 5 Drawing Sheets

METHOD FOR SECURING A DISPLAY DIAGNOSTIC DEVICE TO A DISPLAY

FIELD OF THE INVENTION

The present invention relates to a method and system of securing a display diagnostic device (e.g., a colorimeter) to a display device (e.g., a LCD display) and more particularly to a method and system using elastic material to secure the diagnostic device without the use of counterweights.

BACKGROUND OF THE INVENTION

Colorimeters are used for measuring the colors of a sample. For example, colorimeters are used to measure colors displayed on a monitor. They are essential for identifying actual colors being displayed, and in some circumstances comparing the displayed colors against industry standard colors. There exists in the art several colorimeters designed to work with CRT style monitors. However, due to the fact that LCD monitors have several different characteristics than CRT monitors, special considerations must be taken into account to secure a colorimeter to a LCD screen. For example, since LCD monitors change apparent color with depending on the viewing angle, it is necessary to secure the colorimeter in a way that takes into account and corrects this variance. Additionally, many LCD monitors include soft viewing screens or touch screens that may alter the color of the screen depending on the amount of pressure applied. In general LCD screens have both spectral and optical characteristics that differ between models (such as LED, and OLED type screens. Furthermore, the physical dimensional differences between CRT and flat panel displays mandate a different approach to securing colorimeters. As such, the standard weighted colorimeter restraints used in the prior art and with CRT monitors are insufficient for use with LCD displays. Some attempts to counteract this problem are detailed in U.S. Pat. Nos. 7,027,140; 6,784,995 and 6,067,166. However each of these patents, hereby incorporated by reference, suffers from individual and collective drawbacks. The cited prior art does not attach the colorimeter in a manner that takes advantage of the thinness of flat-panel displays and devices. For examples U.S. Pat. No. 6,784,995 to Merle, employs the use of compensated counterweights and free hanging devices that could damage the screen. Also, the very large screens currently used in flat panel displays make these mechanisms awkward to incorporate. What is needed in the art is a device that provides a stable platform for the measurement of the colors generated by a LCD panel, especially one that comprises a very large screen. The present invention addresses these deficiencies in the prior art by providing a more secure and versatile solution to measuring color on LCD monitors and other thin displays.

SUMMARY OF THE INVENTION

The present invention relates to color measuring devices and methods of attaching the same to display devices. In particular, the present invention is directed to a system for securing devices for the measurement of color produced on thin or flat panel televisions, computer monitors or portable devices. The present invention, while herein described with particular reference to LCD monitors, is in no way limited to such devices. Those skilled in the art will readily appreciate that the present invention has other applications and can be applicable to other display devices not mentioned.

The present invention is also directed to a method for configuring and securing a colorimeter or other display diagnostic device so as to ensure that the device achieves the necessary stability in order to take an accurate color measurement produced by a flat panel display using circuitry which is, for the most part, conventional, and includes among other things a sensor orientable toward the display device. The present invention takes into account the special characteristics of modern flat panel designs and provides a methodology for ensuring a stable and adaptive platform for diagnostic testing. Also, this design is intended for large displays, as other systems are not effective on the larger displays currently becoming common as TVs.

As stated above, the present invention is also directed to a system for attaching a diagnostic device to a LCD panel using elastic restraints. These restraints provide stability, while eliminating the need for complex counterweights. Therefore, the present invention also provides a system and method for the use and management of a plurality of elastic cables and restraints so as to provide optimal stability of a display diagnostic device without the use of counterweights.

The present invention also is directed to securing a display diagnostic device to a display device with minimal pressure on the LCD screen. The present invention incorporates an exterior cover or harness that can be independent of, or integral to, a diagnostic tool. In an embodiment of the present invention, this harness allows for the securing and restraining of a plurality of elastic bands that are used to mount the diagnostic tool to a display device. These elastic bands are of sufficient length and have elastic properties such that each end of each of the elastic bands is capable of being secured around the display device. It is envisioned that the elastic bands are sized for a particular screen size monitor. However, the present invention also includes compression sleeves or cord restraints so as to secure excess elastic material in the event that a cord is longer than necessary for a given application. The present invention also provides cushions and soft restraints that allow the edges of the monitor device to be protected from the elastic bands, and a method for applying same.

BRIEF DESCRIPTION OF THE DRAWINGS

The foregoing and other features of the present invention will be more readily apparent from the following detailed description and drawings of illustrative embodiments of the invention in which list the drawings and their captions. For example.

DETAILED DESCRIPTION OF THE INVENTION

By way of overview and introduction, the present invention concerns a method and system for the securing of colorimeters and/or other diagnostic tools to a flat panel display or device so as to accurately measure the content and conditions displayed therein. The system is further directed to allowing a user to determine the placement of the diagnostic tool using elastic straps. Lastly, the present invention allows for the securing of a diagnostic tool in a manner that prevents the diagnostic tool from marring or otherwise damaging the surface of display devices.

Figure 1:
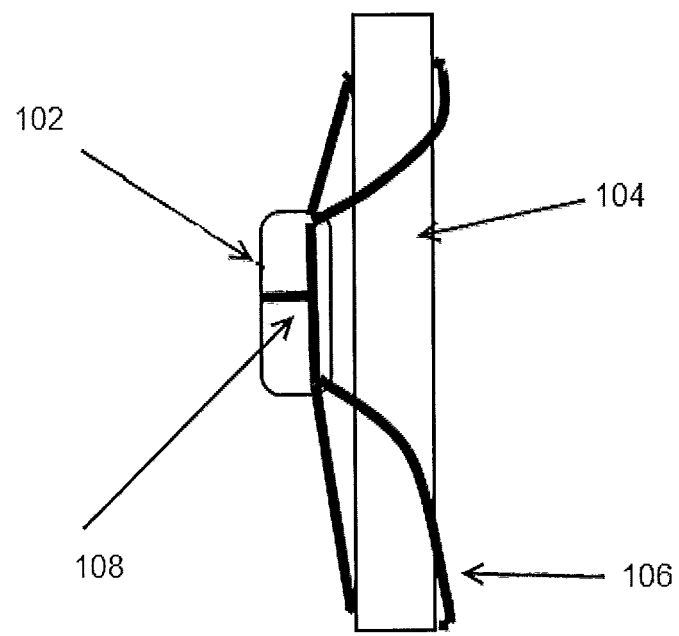
FIG. 1 is an illustrative side view of an embodiment of the invention.

As seen in FIG. 1, the present invention provides for a diagnostic tool 102, such as a colorimeter, that is secured to a flat panel display device 104 in a manner designed to allow proper diagnostic and calibration functions to be undertaken. The colorimeter 102 is attached or secured to the display by one strap 106, or, more preferably, a plurality of elastic straps 106.

While the present descriptions herein refer to the diagnostic device as a colorimeter, those skilled in the art would appreciate that the present invention is not limited to those manner of devices and has broad applicability within the art. When the diagnostic device is a colorimeter, it is envisioned that the colorimeter can be a consumer grade or professional grade color measurement device. In the event that the colorimeter is a third-party product, a releasable/removable harness 108 can hold and secure the colorimeter 102. In the depicted embodiment, the colorimeter 102 is fitted with a harness 108 that has been specifically customized to the shape and dimensions of the diagnostic tool. Alternative embodiments provide for a standardized harness configured to be compatible with a wide variety of colorimeters. For example, the harness employs Velcro brand strips, buttons, fasteners, clamps and so on to secure the harness around the diagnostic device.

The harness 108 is configured to fit over or around the colorimeter 102 and is designed to not interfere with the colorimeter's functionality. The harness 108 is configured to rest securely at a point that is in front of, and not in contact, with the display portion of the display device. This ensures that the harness 108 does not damage the display device through friction. In one embodiment of the present invention, the harness 108 is formed of a flexible material such as vulcanized rubber, textiles, carbon fiber, or flexible synthetic materials. Those skilled in the art would readily recognize those materials suitable for the harness 108, and recognize that the harness 108 is not limited to those materials specifically listed.

The harness 108, when not integral to the diagnostic device, is removable, allowing it to be used with different devices and models. The harness 108 also features securing devices such as Velcro strips, clasps, buttons, clamps, and so on that enable the harness to envelope and securely hold the diagnostic device to the display screen.

Figure 2:
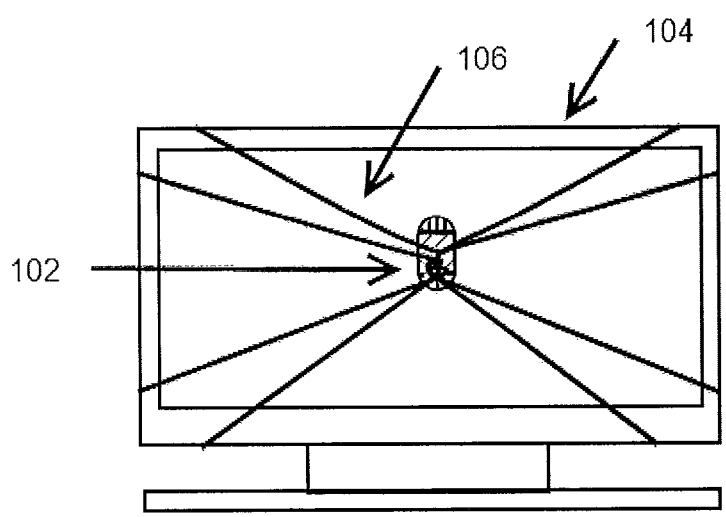
FIG. 2 is an illustrative front view of the embodiment of the invention.

The harness 108 of the present invention is also configured to have, e.g., have affixed thereto, at least one restraining bracket secured in a fixed position relative to the harness and having the form of a material loop, eyelet, hook or clamp to secure one or more elastic bands. In a particular embodiment of the present invention, the eyelet is constructed of resilient material sufficient to resist tearing or deformation under stress. The eyelet is configured to allow a complete loop of elastic material 106 to be threaded or passed through its center. As seen in FIG. 2, the elastic straps 106 of the illustrated embodiment are configured as one complete loop of elastic material. In this way both ends of the elastic material can be looped over respective corners of the display device. However, in an alternative embodiment the elastic straps are formed as separate loops stretched between each corner of a display device and the harness. The loop itself is secured to the harness by threading the elastic material into one or more of the restraining brackets. This allows for a secure strong connection between the harness and the loops. The elastic loops can be made of rubber straps, cables or other materials that have high elasticity characteristics. Those skilled in the art know those materials, natural or synthetic, that are suitable for use in as elastic bands.

In the embodiment of the present invention as shown in FIG. 2, the colorimeter has been positioned for the sake of clarity, in a center front position of a display device. The performance of the colorimeter is not influenced by the location of the device relative to the front of the screen. Therefore, it is possible to position the colorimeter in any location so long as an accurate measurement can be taken. For example, as shown in FIG. 3, the present invention is secured in the upper corner of a display device.

Figure 3:
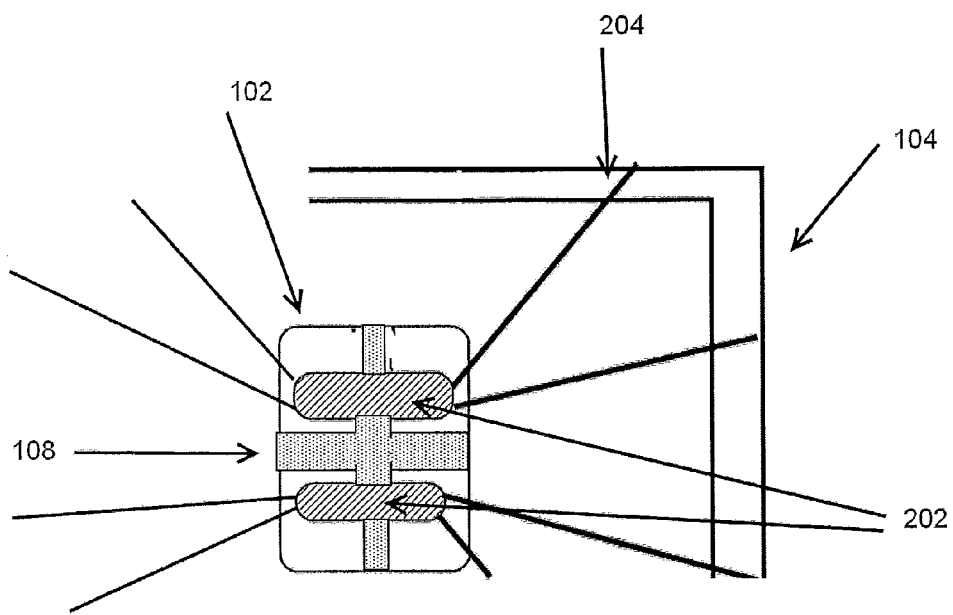
FIG. 3 is an enhanced view of elements of the invention as disclosed in FIG. 2.

As further shown in FIG. 3, elastic straps are configured to pass through at least two restraining brackets 202. In this way each end of the elastic loop 204 can be secured around an edge of the display device. As shown, two elastic bands are used to secure the colorimeter 102 using the restraining harness 108. In alternative embodiments, a plurality of elastic bands can be used, their elasticity allowing application to a range of screen sizes.

As further shown in FIG. 3, the elastic bands, while secured by the corners of the display device, exert sufficient tension on the harness 108 and the colorimeter 102, thereby providing a stable platform from which to analyze the colors of the monitor (that is, the display device). In addition to providing a stable platform, the tension in the elastic bands allows the colorimeter to be in close proximity to the surface of the display device, without actively resting upon or applying pressure to the display device.

The elastic bands of the present invention pass through the restraining brackets 202 as seen in FIG. 3. The restraining brackets can be equipped with a cord locking device (not shown). The cord locking device allows the diagnostic tool to be placed over a specific portion of the screen and locked into place. This can be accomplished by a compression clip, bolts, or grips that prevent the movement of the elastic bands through one or more of the restraining brackets 202, and which has the effect of reducing a length of the loop of each elastic strap 106.

In an alternative embodiment, the diagnostic tool's housing can be configured with a cord locking device that secures the elastic material at the ends of the elastic loop. In this way excess or additional elastic material can be secured behind the display device. The cord locking device, regardless of placement, provides the ability to use longer elastic bands than necessary to secure the harness to a given size display device. As such, a greater range of display device sizes can be accommodated with a single sized elastic strap or set of straps.

The diagnostic tool is optionally fitted with a cushion or buffer material that is disposed so as to prevent the cord locking mechanism from scratching or otherwise marring a rear surface of the display device. Also, optionally, the elastic straps can be coated or otherwise encased in soft or non-abrasive materials. For example, the elastic bands of the present invention can be inserted into sleeves of soft fabric, such as felt or cotton.

Figure 4:
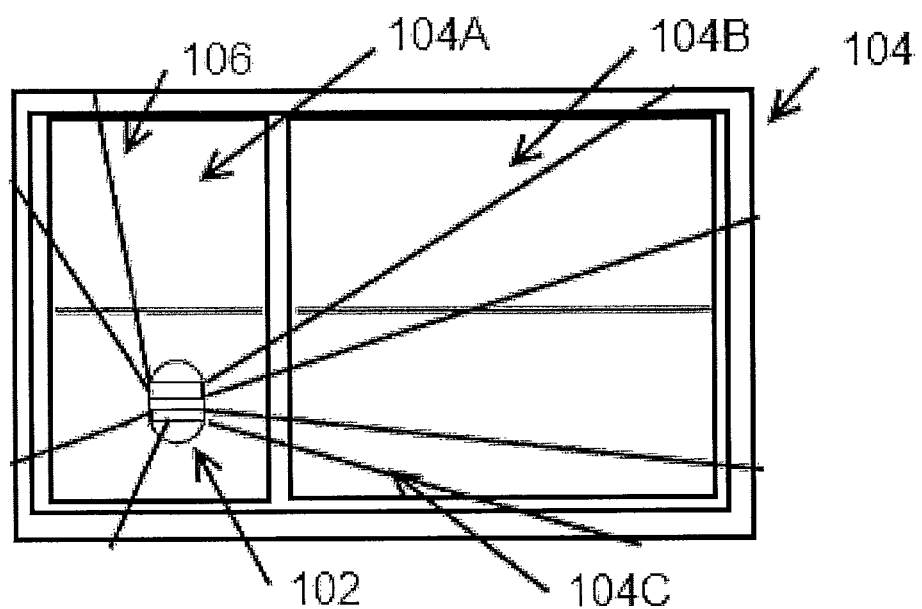
FIG. 4 is an illustrative front view of one of the embodiments the present invention.

In an alternative embodiment of the present invention, as depicted in FIG. 4, the display device has partitioned the active display into a plurality of sub-display regions (104A-C). In this configuration, it is preferable to have different calibrations for each different section of the display device. Therefore, the device can be moved from a center position to an off-center position all while maintaining proper distance from the display device. The harness of the colorimeter, equipped with a plurality of cord locking devices, can be slid along the length of the elastic cables to a suitable position in-front of the display device and re-secured using the cord locking devices. In an alternative embodiment, the cord-locking devices are nominally in the engaged position such as with the use of compression or spring-loaded cord-engaging mechanism. In this embodiment, the cord-locking mechanism can be disengaged and then the harness and diagnostic tool slid along the cables into a desired position. Thus, a user of the present invention may position a colorimeter generally at any location within the boundaries of the corners of a display screen thereby ensuring that the colorimeter will not deviate from its position through gravity or tension.

Figure 5:
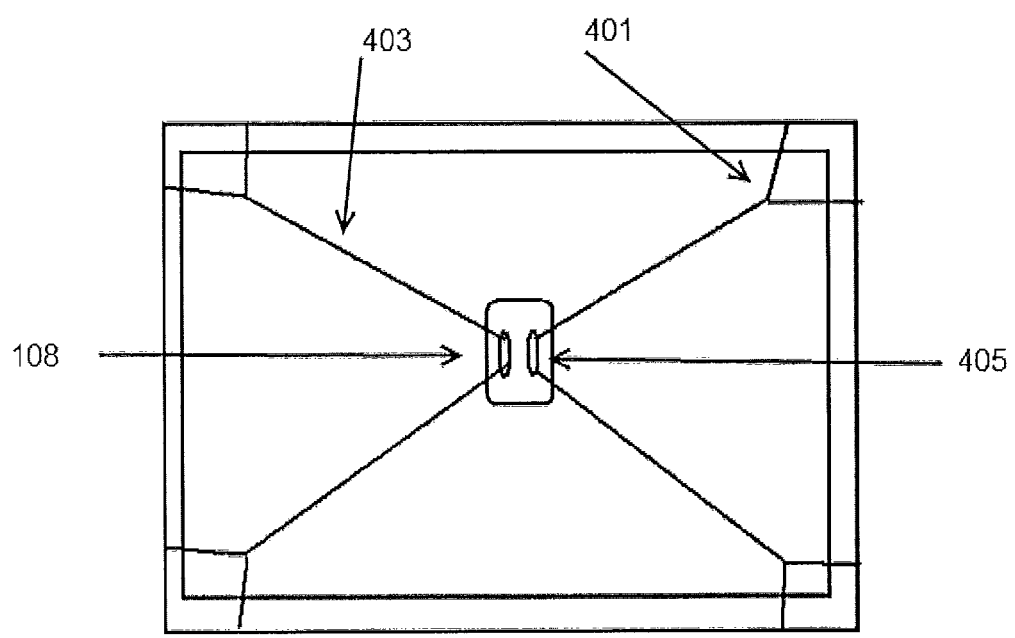
FIG. 5 is an illustrative front view of one of the embodiments of the present invention.

In the embodiment of the present invention depicted in FIG. 5, the harness 108 is provided with at least one spring-governed spool 405. Each spool 405 is loaded, wound, or otherwise charged with a length of elastic material that consists of a single strand 403 of material that expands into a loop 401. In this embodiment, the position of the diagnostic device will be determined by the elastic tension of both the elastic material, and the resilient tension of the spring governed spool. This embodiment provides for storage of the elastic material in the spring spool when not in use.

The present invention provides a methodology for employing the above described elements so as to ensure that an accurate diagnostic reading is taken of a LCD panel. The methodology of the present invention includes a positioning step, wherein the desired location of the diagnostic tool is determined, depending on the nature of the diagnostic actions. For example, as discussed above, the LCD panel of a given display device can have a plurality of sub-display regions, each requiring a different calibration setting. Under those circumstances, the methodology includes a step of positioning the diagnostic device (or tool) in front of the display at a location that is suitable for diagnostic functions. Once the proper position has been determined, the additional steps as described below can be undertaken. In situations where there are multiple sub-displays, the positioning step is repeated for each sub-display. After each position on the display has been determined, a series of steps are performed regardless of the number of sub-displays. These steps include, but are not limited to, an orienting step, wherein the position within the display or sub-display is determined. For example, due to space or location constraints, it might be preferable to position the diagnostic tool at a corner of the LCD panel or sub-display as opposed to the center.

After the position within the display is determined, a securing step is provided, wherein a plurality of elastic cords are secured around the corners of the LCD device. In those situations wherein the display device does not have right angled corners, the present invention provides for securing the elastic material around any pinnacle or protrusions that allows the securing of an elastic loop. For example, a star-shaped display has a plurality of pinnacles or protrusions with which to secure a loop of elastic material. Furthermore, when displays lacking pinnacles or protrusions are employed, the elastic material can be secured around external device or power connectors.

A locking step is provided, wherein the cord locking device is engaged and the position of the diagnostic tool is secured and immovable. Optionally, depending on the size of the elastic material used, a slack securing stage is provided, wherein the excess elastic loop material is accumulated behind a compression clip or clamp and positioned behind the display device. In this way, the loop material is sized properly for the display device.

An optional calibration stage can be performed in which the colorimeter is engaged and the display device is calibrated.

It is possible to proceed in an order other than as discussed above. For example, once the device has been positioned, orientated, and locked into place, it might be preferable to re-position the device. In that event, the securing stage is not replicated since the cord-locking step, once removed, allows for the device to move to any position on the display provided there is sufficient elasticity or slack. In instances in which there is insufficient elasticity, a second slack securing step can be performed such that the amount of elastic material secured behind the display is increased or decreased to allow for greater movement.

In an alternative embodiment, the present invention methodology includes steps of moving the diagnostic device to a preferred position and extracting from a plurality of spring loaded spools a plurality of elastic loops. A securing step is provided in which the elastic loops are secured around the corners of a display. An optional step is provided in which the spools are in possession of cord locking device. In this optional step, the cord-locking device is engaged so as to secure the diagnostic device at the proper location. In this embodiment, the present invention is configured without a slack securing step. However those skilled in the art would clearly appreciate the modifications that are available to the methodology and system described herein.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention

We claim:

1. An apparatus for securing a diagnostic tool proximate to and in front of a display device between the corners thereof, comprising:
   a harness adapted to releasably hold the diagnostic tool,
   a restraining bracket extending from the harness, the harness configured to allow the passage of at least one elastic cord through the restraining bracket wherein the restraining bracket is further configured to selectively permit or restrict the movement of the elastic cord through the bracket;
   wherein the at least one elastic cord has a first end, an intermediate portion and a second end, the cord being threaded through the restraining bracket and being sized so as to impart elastic tension to the corners of the display device while concomitantly protecting the front surface from pressure due to the position of the harness and diagnostic tool, and wherein the harness includes a spring-mediated spool, wherein the first end of the elastic cord is mounted for unwinding from the spring-mediated spool.

2. The apparatus of claim 1, wherein the first end and the second end of the elastic cord are joined so as to form a single loop.

3. The apparatus of claim 2, wherein the elastic cord has at least one cord locking means adapted to compress the cord loop at a position along its length so to define first and second loops from the single loop.

4. The apparatus of claim 3, wherein the cord locking means is adjustable so as to prevent the harness and diagnostic tool from coming into contact with the front surface of the display device.

5. The apparatus of claim 1, wherein the harness is configured to permit the rotation of the display diagnostic tool within the harness.

6. The apparatus of claim 1, wherein the first end of the elastic cord is joined to the intermediate portion of the cord.

7. A colorimeter adapted for positioning proximate to and in front of a display device between the corners thereof, comprising:
   a harness defining an exterior housing,
   a colorimeter disposed within the harness and including circuitry for identifying a color using a sensor orientable toward the first of the display device;
   a restraining bracket extending from the harness on a side that is substantially opposite the sensor, configured to allow the passage of at least two elastic chords;
   each of the at least two elastic chords having a first end, an intermediate portion and a second end, the cords being threaded through the restraining bracket and being sized so as to impart elastic tension to opposing corners of the display device while concomitantly protecting the front surface from pressure due to the position of the harness and colorimeter, the first end and the second end further configured to be secured around a first and second corner of the display device,
   wherein the colorimeter is configured to rotate within the housing.

8. The colorimeter of claim 7, wherein the restraining bracket is further configured to provide means for selectively permitting or restricting movement of the elastic cord through the bracket.

9. The colorimeter of claim 8, wherein the first end and the second end of the elastic cord are joined so as to form a single loop.

10. The colorimeter of claim 9, wherein the elastic cord has at least one cord locking means adapted to compress the cord loop at a position along its length so to define first and second loops from the single loop.

11. The colorimeter of claim 10, wherein the cord locking means is adjustable so as to prevent the harness and colorimeter from coming into contact with the front surface of the display device.

12. The colorimeter of claim 7, wherein the colorimeter is mounted for rotation relative to the harness, wherein the first and second ends of the at least two elastic bands are each affixed to a different corner of the display device.

13. The colorimeter of claim 7, wherein the harness includes a spring-mediated spool, wherein the first end of the elastic cord is mounted for unwinding from the spring-mediated spool.

14. The colorimeter of claim 7, wherein the first end of the elastic cord is joined to the intermediate portion of the cord.

15. A method for securing a diagnostic tool to a display device, comprising the steps of:
   securing the diagnostic tool to a harness, the harness having a restraining bracket configured to allow the passage of at least one elastic cord through the restraining bracket;
   manually positioning the diagnostic tool and harness together, in one step, at a position proximate to and in front of the display device;
   stretching the at least one elastic cord around two opposing corners of the display device, the stretching extending on opposite sides of the restraining bracket;
   configuring the restraining bracket to restrict relative movement between the harness and the elastic cord; and
   releasing the diagnostic tool and harness;
   whereby the stretched elastic cord imparts elastic tension to the opposing corners of the display device while concomitantly protecting the front surface of the display device from pressure, and further comprising rotating the diagnostic tool within the harness in advance of a display diagnostic step being performed on the display device.

16. The method of claim 15, further comprising the steps of:
   configuring the restraining bracket to permit movement of the elastic cord through the restraining bracket;
   moving the harness and diagnostic tool from a first position to a second position along the elastic cord; and
   reconfiguring the restraining bracket to restrict relative movement between the harness and the elastic cord.

17. The method of claim 15, wherein the manual positioning step further comprises positioning the diagnostic tool and harness at a position that is not in contact with the display device.

18. The method of claim 15, further comprising a locking step wherein a length of elastic cord is locked with a cord locking device so as to eliminate excess cord length and ensure sufficient tension to support the diagnostic tool between the opposing corners of the display device.

* * * * *